UNITED STATES PATENT OFFICE.

CHARLES J. EAMES AND CHARLES A. SEELY, OF NEW YORK, N. Y.; SAID EAMES ASSIGNOR TO ISABELLA EAMES.

IMPROVEMENT IN THE MANUFACTURE OF SOAP.

Specification forming part of Letters Patent No. 65,186, dated May 28, 1867; reissue No. 5,007, dated July 30, 1872.

*To whom it may concern:*

Be it known that we, CHARLES J. EAMES and CHARLES A. SEELY, of the city, county, and State of New York, have invented a new and Improved Composition for Soap; and we do hereby declare that the following is a full and exact description thereof.

The nature of our invention consists in a new soap compound, produced by incorporating carbolic and cresylic acids, either one or both, with ordinary soap. These substances are well known for their useful properties, and we have found that when combined with soap the detergent value of the soap is improved, and the properties of the acids are not masked or destroyed.

To enable others skilled in the art to make and use our invention, we proceed to describe it in detail.

By soap we mean any of the compounds of alkali with oil or fat which are known and used in the arts under that name. Our invention is applicable to all kinds of ordinary detergent soap, and to several saponaceous compounds prepared for medicinal use.

We employ one of the following ways of incorporating carbolic acid and cresylic acid with the soap: First, the acid or acids is dissolved in the alkaline solution before the addition of fat. Second, the acids are dissolved in the melted fat; or, third, the acids are mixed in with the finished soap by means of crutching or other mechanical device.

From the nature of the case we do not limit ourselves to any specific proportions of the carbolic and cresylic acids to the soap. For a toilet-soap, five to fifty drops of the acid to the pound of soap will be found to give satisfactory effects, while as much as ten to twenty-five per cent. of acid may be used with other soaps.

We are aware that gas-tar and the dead-oil of gas-tar containing a small proportion of carbolic acid have been made into emulsions of a somewhat saponaceous character by means of alkalies and saponifiable fats; and we are also aware that the dead-oil of gas-tar was formerly sometimes known under the name of crude carbolic acid; but the mixtures so made did not owe their efficiency to the small proportion of carbolic acid contained in them, and they were impracticable for the purposes to which soaps are applied. We, therefore, disclaim all such mixtures.

By carbolic acid and cresylic acid we mean the chemical products known under the names, respectively, of phenol or phenylic alcohol and cressol or cresylic alcohol.

We claim as our invention—

1. A soap made by incorporating carbolic acid or its equivalent with ordinary soap, substantially as above specified.

2. The combination of carbolic acid or its equivalent with the oils and fats to be used in the manufacture of soap.

3. The combination of carbolic acid or its equivalent with alkaline solutions to be used in the manufacture of soap.

CHARLES J. EAMES.
CHARLES A. SEELY.

Witnesses:
HERMANN KERSTING,
HENRY WURTZ.